United States Patent [19]

Lamel

[11] 4,283,779
[45] Aug. 11, 1981

[54] TORSIONAL WAVE GENERATOR

[75] Inventor: Arthur E. Lamel, Arcadia, Calif.

[73] Assignee: American Petroscience Corporation, Bakersfield, Calif.

[21] Appl. No.: 21,578

[22] Filed: Mar. 19, 1979

[51] Int. Cl.$^3$ .............................................. G01V 1/40
[52] U.S. Cl. ...................................... 367/82; 175/40; 175/50
[58] Field of Search .................................. 367/81–85; 175/40, 50; 181/106

[56] References Cited

U.S. PATENT DOCUMENTS

| | | | |
|---|---|---|---|
| 3,805,606 | 4/1974 | Stelzer | 367/82 |
| 3,813,656 | 5/1974 | Fowler | 367/82 |
| 3,900,827 | 8/1975 | Lamel et al. | 367/82 |
| 3,906,435 | 9/1975 | Lamel et al. | 175/50 |

*Primary Examiner*—Howard A. Birmiel
*Attorney, Agent, or Firm*—Fulwider, Patton, Rieber, Lee & Utecht

[57] ABSTRACT

A torsional acoustic wave generator for use in an acoustic drill-string telemetry system, the generator having a reaction mass rotatably mounted near the lower end of a drill string, and a fluid coupling for generating a torque between the reaction mass and the drill string and thereby applying a sudden torsional pulse to the drill string. In the disclosed embodiment of the invention, the fluid coupling comprises a number of chambers rigidly connected to the reaction mass, an equal number of vanes rigidly connected to the drill string and disposed in the cylinders, and a mud control valve for selectively directing drilling mud into the chambers to generate a torque between the chambers and the vanes, and thereby apply to the drill string a torsional pulse that is independent of such factors as drill-string angular velocity.

16 Claims, 13 Drawing Figures

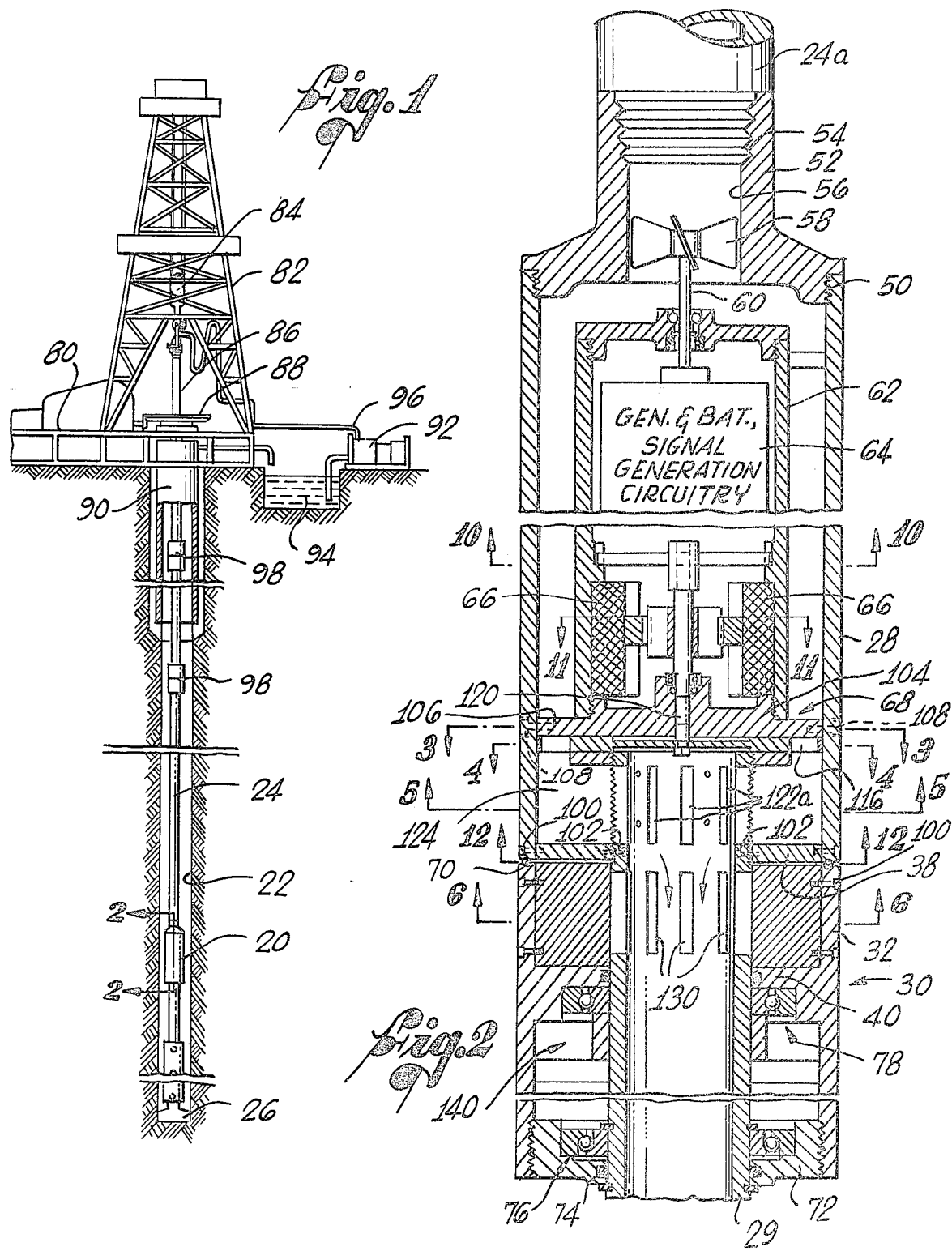

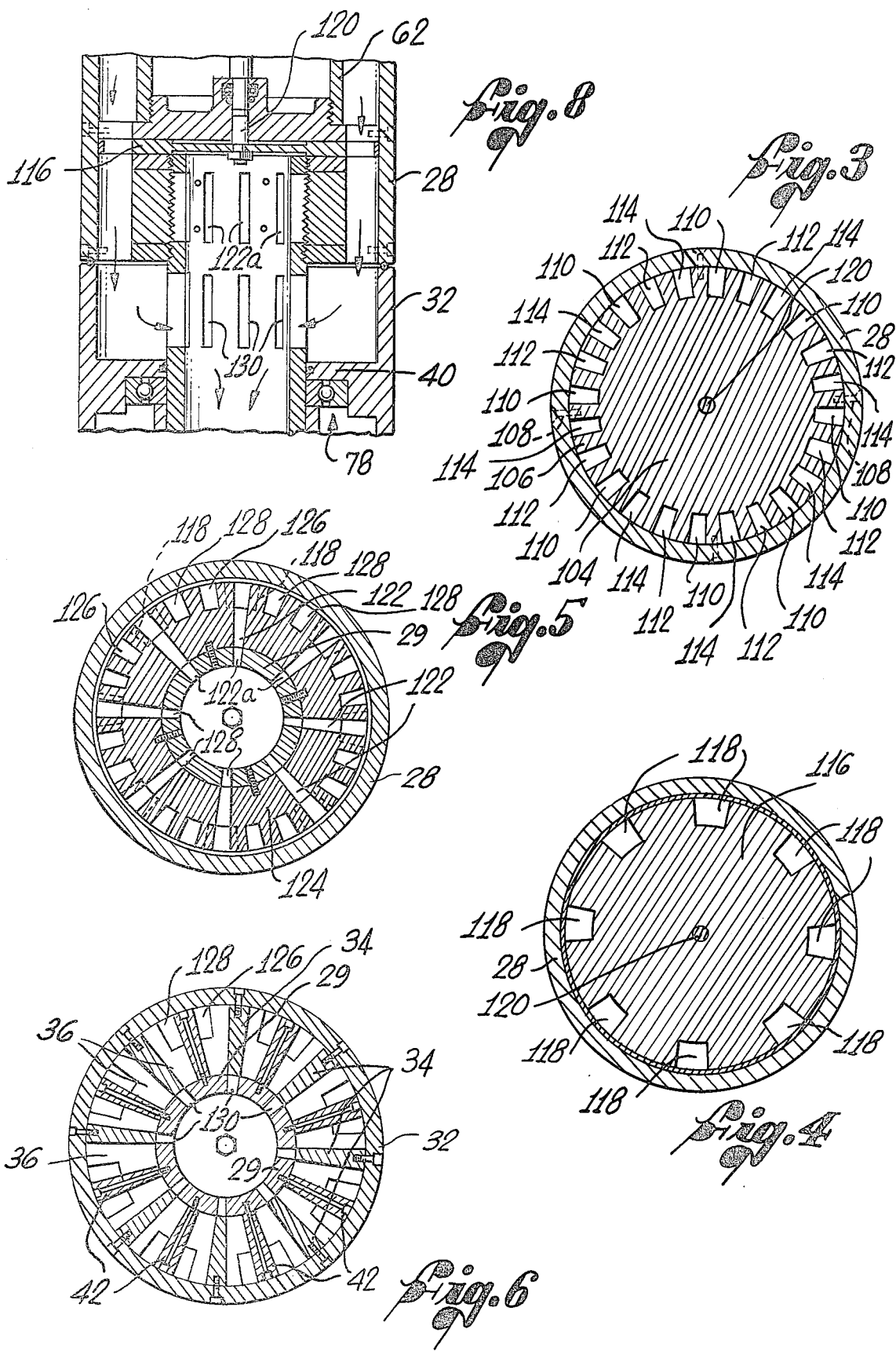

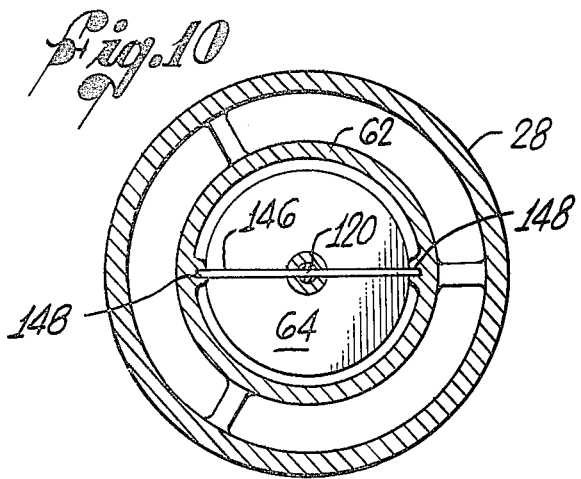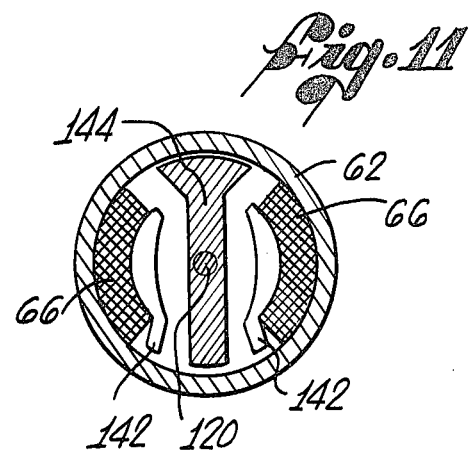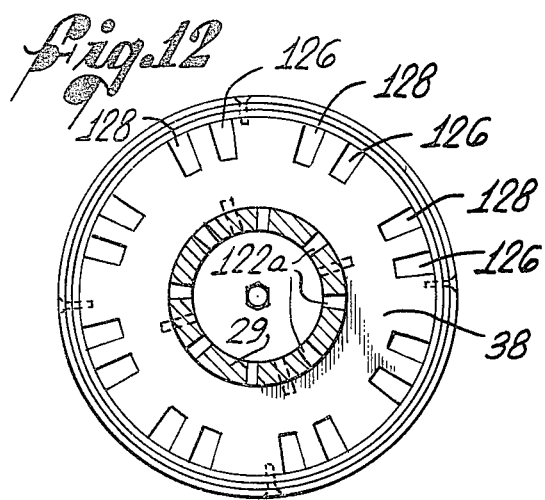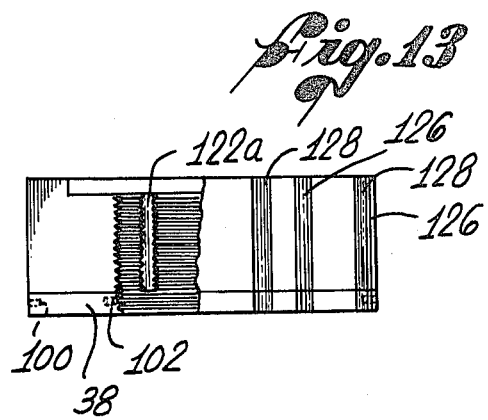

TORSIONAL WAVE GENERATOR

BACKGROUND OF THE INVENTION

This invention relates generally to drill string telemetry systems, and, more particularly, to drill string telemetry systems utilizing torsional acoustic waves for the transmission of information along a drill string, which may be in motion.

A description of the construction and operation of acoustic telemetry systems for oil wells can be found in U.S. Pat. No. 3,790,930, entitled Telemetering Systems for Oil Wells, and U.S. Pat. No. 4,001,773, entitled Acoustic Telemetry System for Oil Wells Utilizing Self Generated Noise, both of which issued in the names of the present inventor and William D. Squire and Harper J. Whitehouse as joint inventors. These patents also set forth the advantages of transmitting telemetry information from the bottom of oil well boreholes by means of acoustic waves. For the most efficient transmission in long runs of drill-string pipe, acoustic waves of the torsional type are preferred, since they sustain less energy loss at joints in the drill string, and they couple less acoustic energy into the fluid surrounding the pipe walls than do compressional waves.

As described in detail in the aforementioned patents, the frequency of torsional waves used for the transmission of telemetry data can be selected to lie in a frequency band that suffers a minimum attenuation during transmission. By way of further background, U.S. Pat. No. 3,990,827, entitled Teletering System for Oil Wells Using Reaction Modulator, also issued in the names of the present inventor and joint inventors William D. Squire and Harper J. Whitehouse, discloses an electro-acoustic transducer capable of producing acoustic waves in a drill pipe, for transmitting telemetry information, and further discloses a driving circuit that converts sensor outputs into activating signals supplied to the transducer.

It will be appreciated that a critical element in acoustic telemetry systems is a reliable acoustic wave generator. The wave generator, in turn, requires a highly reliable source of power. Self-contained power sources, such as batteries, capable of powering an acoustic wave generator for the entire life of a drilling operation are too bulky to be accommodated at the bottom of the borehole. Furthermore, supplying generator power through electrical conductors is impractical for the same reasons as telemetry using electrical conductors. A conductor located outside the drill string would be exposed to sharp rocks in the borehole, and would be likely to break or tear. On the other hand, a conductor located inside the drill string would be difficult to handle when sections of pipe were added to or removed from the drill string.

One technique for transmitting power to the bottom of the borehole is to utilize the flow of drilling mud. Drilling mud is a viscous fluid used to take into suspension drilling debris, and to remove this debris from the borehole by carrying it to the surface. The mud is pumped under pressure down the drill string pipe and down to the drill bit, where it leaves the drill string, picks up the drilling debris, and transports it to the surface.

Some telemetry devices of the prior art have used the flow of drilling mud to produce compressional acoustic waves, by inducing pressure surges in the mud flow. Other prior telemetry devices have used the flow of drilling mud to produce torsional waves by deflecting the mud flow in such a manner as to give it a tangential component of velocity. By way of example of such prior devices of the first type, U.S. Pat. No. 3,711,825 discloses a device that produces momentary pressure surges in the drilling fluid, in the nature of water hammer, by selectively closing a valve to interrupt the flow of drilling mud. The device disclosed in the aforementioned patent, in common with other prior art devices, produces waves that are chiefly of the compressional type, such waves being less effective carriers than torsional waves, especially in pipe having a long run and many joints.

U.S. Pat. No. 3,813,656 discloses two devices suitable for producing torsional waves in drill strings. In one of these, mud is selectively directed to jets, through which it is expelled tangentially to the drill string, thereby producing a rotational torque and an attendant torsional wave. Such an arrangement tends not to produce desirably sharp, nearly instantaneous torsional pulses. Further, the torque produced by the jets varies significantly with the density and viscosity of the mud.

Another technique for generating torsional waves is to employ a braking device capable of producing torsional waves by decelerating the drill string, either by engaging a normally stationary mass to the drill string, or by engaging a part of the drill bit or drill string into the sidewall of the borehole. An example of a device of the former, mass engaging type is disclosed in U.S. Pat. No. 3,813,656. When a large stationary mass is first coupled to the drill string, the mass tends to decelerate an adjacent portion of the drill string, and thereby produces a torsional wave.

Braking devices of either the mass engaging or the wall engaging type have certain inherent shortcomings. The decelerating effect, and the nature of the wave thereby generated in these devices, are dependent either upon the difference between the angular velocity of the mass and that of the drill string, in the mass engaging device, or upon the efficiency of the braking action, in the wall engaging device. The efficiency of the braking action depends, in turn, upon the coefficient of friction of the braking surfaces employed, one of which may be the sidewall of the borehole. Therefore, the decelerating effect of the brake, and the nature of the resulting wave, cannot be modified after the device is placed in service at the bottom of the borehole, and will be subject to changes in conditions in the borehole.

The changes in conditions in the borehole that affect torsional wave generation in wall engaging devices include not only changes in efficiency of the brake, but also variations in the transmission characteristics of the drill string, which variations may dictate the use of a different frequency for best wave transmission. One method of compensating for changes in braking efficiency, and for such variations in transmission characteristics that may occur as the drill bit depth increases, is to vary the rotary speed of the drill. Varying the speed in order to produce sharply defined waves can, of course, result in operation of the drill string at some speed other than the most efficient speed from a standpoint of drill bit operation. Consequently, drilling efficiency may be sacrificed to achieve satisfactory or improved data transmission.

In mass engaging devices for the generation of acoustic waves, it is possible for friction between the drill string and the mass to accelerate the mass gradually to nearly the drill string angular velocity. Such an accelerated mass when engaged would produce little decelerating effect, since the difference between the angular velocities of the mass and drill string would be small. Moreover, whenever the mass is engaged it must itself be accelerated in order to produce deceleration in the drill string. Therefore, after the mass is first used to produce a torsional acoustic wave, its angular velocity is no longer accurately known, and the nature of subsequently produced torsional acoustic waves will be largely unpredictable.

In recent years, the search for new oil sources has increasingly required deep drilling and directional, or non-vertical, drilling. Telemetry in such drilling operations is especially important, to provide operators with accurate data from the bottom of the borehole without their having to remove the drill string. As discussed above, prior acoustic telemetry techniques using mud "water hammer" rely primarily on compressional or longitudinal acoustic waves, which suffer relatively large transmission losses. Moreover, prior devices employing torsional acoustic waves generated by string drill deceleration all have significant shortcomings, as discussed in the foregoing paragraphs.

It will be apparent, therefore, that there is still a critical need for an improved acoustic wave generator for use at the bottom of a borehole; one that does not require batteries or other external electrical connections, and one capable of producing well defined torsional waves without regard to the drill string velocity or other variables. The present invention fulfills this need.

SUMMARY OF THE INVENTION

The present invention resides in an acoustic wave generator intended for operation at a location near the bottom of a borehole, where it is to generate torsional waves capable of acoustically transmitting telemetry information along a drill string. The generator produces waves having a high signal-to-noise ratio, nondispersive propogation characteristics and sufficient intensity for use in carrying information even while the drill is engaged in cutting operations. The generator of the invention produces waves of the desired waveform regardless of the borehole depth, the sidewall characteristics of the borehole, the density and viscosity of drilling mud used in the borehole, and the speed of rotation of the drill string. The device is rugged, is capable of sustained use, does not interrupt the continuous flow of drilling mud, and is capable of producing sharply defined torsional waves regardless of the depth of drilling and the level of ambient noise.

The device of the invention achieves these results by producing a torque between the drill string and a reaction mass that is rotatably attached to the drill string near the bottom of the borehole. The moment of inertia of the reaction mass is preferably greater than that of an adjacent portion of the drill string. Consequently, the torque produced by the generator tends to induce rotation in the adjacent portion of the drill string, rather than in the reaction mass.

In a presently preferred embodiment of the generator, the reaction mass has a number of chambers and an equal number of movable walls, or vanes, which act as torque-producing pistons moving in the chambers. Drilling mud can be directed into the chambers, and once the chambers are filled, the mud causes the vanes to move relative to the chambers. Movement of the vanes also has the effect of opening a number of ports through which mud can leave the chambers. The chambers are arranged circumferentially about the central axis of the drill string, and the vanes are disposed radially in the chambers, for rotational movement about the central axis. The vanes are connected to a common central shaft, which is, in turn, rigidly connected to an adjacent portion of the drill string, and as the vanes move within the chambers they impart rotation to the drill string.

When the generator is not being used to transmit information, the vanes attached to the drill string, and the chambers attached to the reaction mass will be rotating together at the same velocity. When the generator produces a torque between the reaction mass and the drill string, this results in a sudden acceleration or deceleration of that portion of the drill string adjacent to the generator.

The device of this invention is designed to produce only a limited degree of relative rotation, but such rotation can be extremely rapid, provided the device is activated by a sufficiently large force. Because the quantity of mud flowing through the entire drill string is relatively great, the mud possesses substantial kinetic energy, and can generate sufficient force to produce nearly instantaneous rotary motion in the drill string.

The wave generator of the invention is coupled into the drill string in the same manner as an ordinary section of pipe, and the drilling mud that flows down the drill string also flows through the device. More specifically, the mud flows through a conduit in the generator to a mud directing valve having three positions. A first position of the valve causes the mud to flow into a series of bypass ducts, which carry the mud back into the drill string beneath the generator without entering the torque producing chambers of the apparatus. In second and third positions of the valve, the mud is directed into second and third sets of ducts, which carry the mud to the chambers on one side or the other of the vanes.

To produce an acoustic wave, the valve is moved from the first position to the second or third position. The mud then fills the chambers and applies a torque to the vanes. This relative vane movement rotates the shaft and the drill string with respect to the reaction mass, thereby propagating a torsional acoustic wave along the drill string.

As the shaft is rotated, exhaust ports in the chambers come into alignment with openings in the shaft, which is hollow, thereby permitting the mud to flow out of the chambers and back to the drill string. Once these exhaust ports are fully opened, mud can flow through the chambers and back into the drill string without effecting any further rapid motion of the vanes.

Before the generator can be used to generate a subsequent acoustic wave the vanes must be repositioned in their starting position with respect to the chambers. First, the valve is moved back to its first position to redirect the mud through the bypass ducts rather than through the chambers. Once the flow of mud into the chambers has ceased, biassing means, preferably in the form of a spring, biases the generator and reaction mass back into a neutral position, wherein each vane is disposed in the center of its chamber, and the generator is ready to produce another acoustic wave.

The device of the present invention is operated in accordance with information signals originating from signal generating circuitry located within the device. The signal generating circuitry receives information from data gathering sensors, and encodes this information into signals capable of transmission by a sequence string 24 have a lower moment of inertia than the reaction mass, this torque results in a sudden acceleration or deceleration of the drill string in the vicinity of the generator 20. As will also be described in detail, drilling mud may also be directed to bypass the chambers 36 completely, in which event the vanes 42 will be biased into a central position with respect to the chambers.

Before turning to a more detailed description of the means employed for selectively directing the flow of drilling mud through the cylinders 36, some of the more general aspects of the generator 20 will first be described. Fitted to the top of the housing 28 by means of screw threads 50 is a threaded adapter 52, which has, in addition to the threads 50, a set of internal threads 54 located in an upper, reduced-diameter section, to provide for rigid connection to a section 24a of the drill string 24. The adapter 52 has a central bore 56 through which the drilling mud is pumped from above, and in which is mounted an impeller 58 for rotation on a shaft 60. Disposed inside and concentric with the housing 28 is an inside shell 62, which contains a generator, battery and signal generation circuitry, indicated at 64, below which is mounted a pair of solenoid coils 66 for control of a mud flow valve, indicated generally at 68.

Between the abutting housing 28 and outer shell 32 is a seal 70, and the outer shell 32 has an annular closure 72 fitted by screw threads into its lower end. This annular closure 72 accommodates another seal 74, as well as a bearing designed to withstand both radial and thrust forces, and to support the entire reaction mass 30 rotatably on the shaft 29. A second bearing 78 is disposed immediately below the annular shoulder 40 of the outer shell 32.

By way of further background, and as illustrated in FIG. 1, the generator 20 of the invention is typically used in conjunction with a drilling rig of conventional design, having a platform 80 on which a derick 82 is mounted to support a hoist 84. A drilling kelly 86 extends downwardly to a rotary table 88, also located on the platform 80, and extends down into the well to a blowout preventor 90, which is sealed to the wall of the borehole 22. A drilling circulation pump 92 delivers drilling mud under pressure from a mud pit 94 located near the rig, through a supply pipe 96 and into the drilling kelly 86. The mud then flows down through the drill string 24, leaves the bottom of the drill string, and returns to the surface outside the drill string, and thence through the blowout preventer 90, and back to the mud pit 94.

The drill string 24 is typically composed of individual sections of pipe of uniform lengths, joined end to end by couplings commonly referred to as tool joints, indicated at 98. In operation, the rotary table 88 is rotated, and drives the kelly 52 and, with it, the drill string 24. The hoist 84 supports a desired portion of the weight of the drill string 24, and thereby maintains a desired axial force on the drill bit 26. The mud pump 92 operates to force the drilling mud down through the drill string 24 to the bottom of the borehole 22, where the mud lubricates the drill bit and picks up debris, which is then carried back to the surface.

It will be appreciated that the drilling torque transmitted down the drill string is also transmitted to the generator body 28 and thence to the hollow shaft 29 through the annular housing bottom 38, which is rigidly secured both to the housing 28 by screws 100, and to the shaft 29 by screws 102.

It will by now be appreciated that the flow of mud into the housing 28 actuates the generator impeller 58 as it enters the housing, and then proceeds down around the annular space between the housing and the inner shell 62. The inner shell 62 has a bottom closure 104 that is attached by screw threads to the inner shell, and has an outer peripherial flange 106 that forms a fixed element of the mud flow control valve 68. The outer flange 106 is secured to the housing 28 by bolts 108 disposed radially in the walls of the housing.

As shown in detail in FIG. 3, the flange 106 has a plurality of uniformly spaced openings formed in it. In the embodiment illustrated, there are twenty-four such openings, and for purposes of description they will be referred to as comprising three sets of openings, indicated as 110, 112, and 114, respectively. Each of the three sets includes eight uniformly spaced openings.

Disposed immediately below the flange 106 is a movable circular plate 116 having, as shown in FIG. 4, eight equally spaced openings 118. The openings 118 have a width approximately equal to the periodic spacing of the twenty-four openings 110, 112, and 114. Consequently, depending upon the angular position of the movable plate 116, the openings 118 will overlap or unmask either a complete set 110, 112, or 114 of openings in the flange 106, or will expose partial areas of two such sets, to maintain a constant flow of mud through the valve 68. When the movable plate 116 is positioned so that its eight openings 118 are centered over a corresponding set of eight openings 110, 112 or 114 in the flange 106, all of the mud then flows through the unmasked set of eight openings in the flange. If the movable plate 116 is then rotated, at some point the trailing edges of its eight openings 118 begin to mask part of the exposed set of eight openings in the flange 106, and simultaneously the leading edges of the eight openings 118 begin to unmask eight openings of a different set in flange. The movable plate 116 is secured to a shaft 120, journaled for rotation in the closure 104. As will shortly be explained in detail, rotation of this shaft 120 is effected by action of the solenoid coils 66.

Situated below and at the same angular positions as the first set of eight openings 110 in the flange 106, is a first set of eight mud ducts 122, best shown in FIG. 5, which extend radially through an annular duct assembly 124 disposed between the valve 68 and the housing bottom 38. This first set of ducts 122 communicates with corresponding ducts 122a in the hollow shaft 29. Consequently, when the movable plate 116 is so positioned as to allow mud to flow through the first set of openings 110, the mud will flow through the ducts 122 and 122a and back into the drill string, via the shaft 29, without flowing through the chambers 36.

Situated beneath and at the same angular positions as the second and third sets of openings 112 and 114 in the flange 106, are second and third sets of mud ducts 126 and 128, respectively, also formed in the duct assembly 124. The second and third sets of mud ducts 126 and 128 extend vertically through the duct assembly 124, to communicate with corresponding openings in the housing bottom 38, which, it will be recalled, forms the upper walls of the chambers 36. The ducts 126 and 128 open into the chambers 36 on opposite sides of the corresponding vanes 42. As shown in FIG. 6, there are eight additional ports 130 formed in the inner cylindrical walls of the chambers 36, i.e., in the wall of the hollow shaft 29. These ports 130 provide a path for the of torsional waves. The encoded signals are then employed to activate solenoids, which operate the mud flow control valve. Power for the data gathering sensors, the signal generating circuitry and the solenoids is obtained from an electrical power generator driven by a turbine disposed in the mud flow.

It will be apparent from the foregoing that the present invention represents a significant advance in the field of acoustic telemetry systems. In particular, it provides a torsional acoustic wave generator that is insensitive to the speed of rotation of the drill string, and avoids the other inherent disadvantages of prior art techniques. Other aspects and advantages of the invention will become apparent from the following more detailed description, taken in conjunction with the accompanying drawings.

BRIEF DESCRIPTION OF THE DRAWINGS

FIG. 1 is a diagrammatic elevational view, partly in section, illustrating a borehole drilling apparatus having a drill string acoustic wave generator constructed in accordance with the invention;

FIG. 2 is an enlarged fragmentary sectional view of the generator taken substantially along line 2—2 in FIG. 1, and showing the operative parts of the generator, including a generator housing, a rotatable reaction mass, chambers associated with the reaction mass, portion of a drill string, vanes rigidly coupled to the drill string, and a spring for recentering the housing with respect to the reaction mass;

FIG. 3 is a sectional view taken substantially along line 3—3 in FIG. 2;

FIG. 4 is a sectional view taken substantially along line 4—4 in FIG. 2, and showing a movable plate in a mud flow valve;

FIG. 5 is a sectional view taken substantially alone line 5—5 in FIG. 2, and showing the arrangement of three sets of mud ducts;

FIG. 6 is a sectional view taken substantially along line 6—6 in FIG. 2, with the vanes shown centered in the chambers ready to generate a wave;

FIG. 8 is an enlarged fragmentary cross-sectional view of the generator taken substantially along line 8—8 in FIG. 7, showing the flow path of mud into and through the chambers, and showing the shaft rotated with respect to the reaction mass from the position shown in FIG. 2;

FIG. 10 is a sectional view taken substantially along line 10—10 in FIG. 2, showing a mud flow valve centering spring;

FIG. 11 is a sectional view taken substantially along line 11—11 in FIG. 2, and showing details of the solenoids that operate the mud flow valve;

FIG. 12 is a sectional view taken substantially along line 12—12 in FIG. 2, and showing the arrangement of two sets of ducts in the bottom of the generator housing; and FIG. 13 is an elevational view, partly in section, to show more detail mud duct assembly contained within the generator.

DETAILED DESCRIPTION

Figure 7:
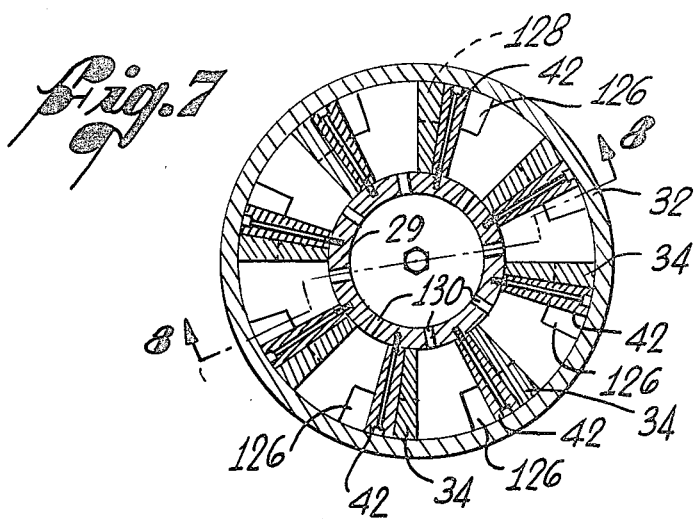
FIG. 7 is a sectional view also taken substantially along line 6—6 in FIG. 2, but with the vanes shown fully displaced in a counter-clockwise direction with respect to the chambers.

As shown in the drawings for purposes of illustration, the present invention is embodied in an acoustic wave generator, indicated by reference numeral 20 in FIG. 1, for producing torsional acoustic waves that can be used for transmitting telemetry signals from the bottom of a borehole 22 along a drill string 24. Acoustic wave generators used prior to this invention have, as fully discussed above, suffered from a number of significant drawbacks, not the least of which is their inability to produce sharply defined acoustic waves independently of such factors as the rotational velocity of the drill string.

As shown in FIG. 1, the generator 20 of the invention is rigidly coupled between two sections of the drill string 24, near a drill bit 26 at the bottom of the string, and, as best shown in FIG. 2, the generator has a generally cylindrical housing 28, the upper end of which is rigidly coupled to the drill string, and the lower end of which is coupled to a hollow central shaft 29 connected to a lower section of the drill string. In accordance with the invention, a torque is generated between the housing 28 and a reaction mass 30 mounted for rotation with respect to the housing. The reaction mass 30 preferably has a greater moment of inertia than that of the housing and a portion of the drill string 24 adjacent to the housing. Consequently, it is the housing 28 and the attached drill string portion, rather than the reaction mass 30, that tend to be accelerated by the torque. More specifically, the reaction mass 30 rotates at the same average angular velocity as the drill string 24, but means are provided for effecting a limited relative rotation between the reaction mass and the drill string, whereby a torsional acoustic wave is propagated along the drill string, and the nature of the acoustic wave is largely independent of the average angular velocity of the drill string.

As best shown in FIG. 6, the reaction mass 30 includes a cylindrical outer shell 32 of substantially the same diameter as the generator housing 28, and is mounted beneath the housing for limited rotation about the shaft 29. The reaction mass 30 includes eight radially disposed walls 34 rigidly secured to the inner circumferential wall of the shell 32. The walls extend inwardly to abut closely against the hollow shaft 29, and thereby define eight chambers 36 within the annular space between the outer shell 32 and the shaft 29. Completing closure of the chambers 36 at their tops is an annular bottom wall 38 (FIG. 2) of the housing 28, and completing closure of the chambers at their bottoms is an annular shoulder 40 formed integrally on the inside of the outer shell 32.

Secured to the shaft 29 are eight vanes 42 extending radially into respective chambers 36 and closely contacting the inner wall of the outer shell 32. Thus, each of the vanes 42 effectively divides a chamber 36 into two portions. As will be described in detail, the reaction mass 30 is spring biased in such a manner as to tend to keep the vanes 42 centrally located with respect to the chambers 36. In this manner, the reaction mass 30 rotates synchronously with the drill string 24 and the attached shaft 29. As will also now be described in detail, relative motion between the vanes 42 and the cylinders 36 is effected by selectively directing drilling mud to one side or the other of the vanes. This generates a torque between the shaft 29 and the reaction mass 30, and, since the shaft and nearby portions of the drill exit of mud from the chambers 36 after the vanes 42 have been rotated with respect to the chambers 36.

One or more flat springs, indicated generally at 140, connect the outer shell 32 of the reaction mass 30 to the hollow shaft 29, and bias the reaction mass to a neutral position, in which the vanes 42 are centrally dispoed in their respective chambers 36. This is essentially the configuration shown in FIG. 6. In this neutral position, the moving valve plate 116 is positioned such that the openings 110 in the flange 106 are uncovered, and the flow of mud is directed into the first set of mud ducts 122, thereby bypassing the chambers 36 completely, and maintaining the reaction mass 30 in its neutral position with respect to the drill string. When the mud control valve 68 is actuated to rotate the movable valve plate 116 either clockwise or counter-clockwise, mud is directed to flow through one of the second or third sets of holes 112 or 114 in the flange 106, then through one of the second or third sets of mud ducts 126 or 128, and thence to one side or the other of the vanes 42 in the chambers 36. Once the mud has filled the chambers on one side of the vanes 42, it exerts a sudden rotational force on the vanes, resulting in the generation of a torsional acoustic wave in the drill string. Simultaneously, the ports 130 in the inner walls of the chambers 36 are uncovered to allow exit of the mud, which can then flow without interruption down the drill string 24. When the movable plate 116 of the valve 68 is returned to its neutral position, the mud is directed through the first set of ducts 122, bypassing the chambers 36, and the vanes are then biased into their neutral position by the action of the spring 140.

Rotation of the movable valve plate 116 is effected by means of the solenoid coils 66, shown in detail in FIG. 11. Each of the coils 66 has associated with it a pole-piece, indicated at 142. The two coils 66 are disposed in essentially diametric relationship inside the inner shell 62. Disposed between them is a diametric armature 144 rotatably mounted in the shell, and rigidly connected to the shaft 120 on which the movable valve plate 116 of the valve 68 is attached. The armature 144 is spring biased to a central position mid-way between the two pole-pieces 142 by a diametric flat spring 146 (FIG. 11) fixed at its mid-point to the shaft 120 and having its ends slidably engaged in radial slots (148) in the walls of the inner shell 62. The armature 144 may be moved from its central position and attracted toward one or the other of the pole-pieces 142 when one of the solenoid coils 66 is energized, thereby rotating the armature and, with it, the rotatable plate 116 of the mud control valve 68.

Figure 9:
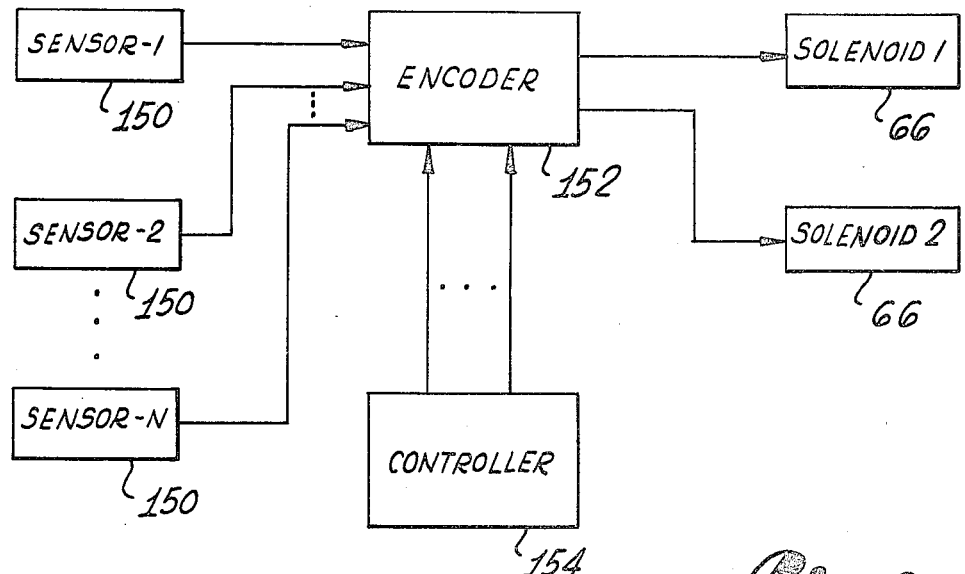
FIG. 9 is a simplified block diagram of the signal generation circuitry.

It will be apparent that activating signals for the solenoid coils 66 have to be provided in order to transmit information by means of the generator 20. Typically, as shown in FIG. 9, information is derived from a plurality of sensors, indicated at 150, and is encoded by an encoder 152, under the direction of a controller 154, to generate the control signals for the solenoid coils 66. It will be appreciated that the block diagram of in FIG. 9 is grossly simplified, but that the necessary logic for performing these functions is well within the state of the art, and, in any event, is highly dependent upon the encoding technique selected for operation of the generator 20. Of course, the details of such an encoding technique form no part of the present invention.

As previously indicated, electrical power for the signal generation circuitry, and for the solenoid coils 66, is provided by an electrical generator and a storage battery housed within the inner shell 62. The electrical generator is driven by the impeller 58 disposed in the mud flow into the generator housing 28, and appropriate seals are provided around the shaft 60 to prevent mud from entering the inner shell 62.

It will be appreciated from the foregoing that the present invention represents a significant advance in the field of acoustic telemetry systems for use with drilling rigs. In particular, it provides an extremely reliable source of torsional acoustic waves for modulation by appropriate information signals. Moreover, the acoustic wave generator of the invention can produce waves that are essentially independent of the rotational speed of the drill bit and independent of other factors, such as the ambient noise level in the borehole.

It will also be appreciated that, although a particular form of the invention has been described in detail for purposes of illustration, various modifications may be made without departing from the spirit and scope of the invention. For example, although the foregoing detailed description relates to a three-way valve, for the generation of torque in either rotational direction, intelligence transmission could be achieved by means of a two-way valve for generating torque pulses in only one rotational direction. Moreover, two such single-directional systems could be combined to obtain an equivalent to the bi-directional system described in detail, either using a common reaction mass or two separate reaction masses. Another analogous technique would be to employ the rotor of a mud turbine as a reaction mass, and to generate torque pulses by selectively diverting mud through the turbine. These and other equivalents of the present invention will be readily apparent to anyone familiar with the acoustic telemetry art. Accordingly, the scope of the invention should not be limited, except as by the appended claims.

I claim:

1. A torsional wave generator capable of propagating torsional waves along a drill string for the purpose of transmitting information signals, said torsional wave generator comprising:
   reaction mass means rotatably coupled to the drill string; and
   means effective independently of drill-string angular velocity, for producing a torque between said reaction mass means and the drill string, whereby a torsional wave is generated for propagation along the drill string.

2. A torsional wave generator as set forth in claim 1, wherein said means for producing a torque includes:
   first fluid coupling means rigidly connected to the drill string;
   second fluid coupling means rigidly connected to said reaction mass means; and
   valve means for selectively controlling the flow of drilling mud to produce a relative torque between said first and second fluid coupling means.

3. A torsion wave generator for connection to a rotatable drill string, for propagating torsional waves along the string, said torsional wave generator comprising:
   a body, rigidly connected to the drill string, and capable of receiving and passing a flow of drilling mud supplied down the drill string;
   a reaction mass rotatably connected to said body; and
   torque producing means utilizing the flow of drilling mud to produce a torque between said body and said reaction mass, thereby producing a torsional wave in the drill string, regardless of the speed of rotation of the drill string.

4. Apparatus for producing torsional acoustic waves in a drill string in accordance with information signals derived from sensors in a borehole, said apparatus comprising:
   (a) a wave generator housing rigidly connected between sections of a drill string near the lower end thereof;
   (b) a reaction mass mounted for a limited degree of rotation with respect to said housing;
   (c) a plurality of fluid chambers rigidly connected to one of said elements (a) and (b);
   (d) a plurality of radial vanes rigidly connected to the other of said elements (a) and (b), and dimensioned to provide an essentially fluid-tight seal between said vanes and said chambers;
   (e) a mud directing valve disposed in said housing and having a fluid input path for receiving a flow of drilling mud down the drill string, and three alternate fluid output paths;
   (f) first, second and third sets of mud ducts coupled to said mud directing valve to receive mud along said three alternate fluid output paths, respectively, said first set of mud ducts communicating directly with the drill string below said housing, and said second and third sets of mud ducts communicating with said chambers on opposite sides of said vanes;
   (g) means for controlling said mud directing valve to direct mud into one of said first, second and third sets of mud ducts, in accordance with information signals to be transmitted as acoustic waves;
   (h) an exhaust port in each of said chambers, said ports being uncovered upon sufficient movement of said vanes, and said ports communicating with the drill string to provide a continuous path for the mud; and
   (i) means for biasing said vanes into a central position with respect to said chambers, to ready said apparatus for generation of another torsional wave when the mud is flowing through said first set of mud ducts;
   whereby flow of mud into said chambers produces a torque between said reaction mass and said generator body, and produces relative motion between said reaction mass and the drill string, resulting in the propagation of a torsional wave in the drill string.

5. Apparatus as set forth in claim 4, wherein:
said chambers are part of said reaction mass; and
said vanes are rigidly attached to the drill string.

6. Apparatus as set forth in claim 4, wherein said mud directing valve includes a rotatable plate having a plurality of openings positionable over one of said first, second and third sets of mud ducts.

7. Apparatus as set forth in claim 6, wherein:
said means for controlling said mud directing valve includes solenoid means actuated by the information signals to effect rotation of said plate; and
said apparatus further includes self-contained power supply means utilizing the flow of drilling mud as a source of energy.

8. A method for generating torsional acoustic waves in a drill string, for the transmission of telemetry data, said method comprising the steps of:
generating a torque between a reaction mass mounted for limited rotation about a drill string and a generator housing rigidly connected into the drill string; rotating said generator housing and the drill string with respect to said reaction mass, as a result of the generated torque; and
thereby propagating a torsional wave along the drill string, independently of the drill string angular velocity.

9. A method as set forth in claim 8, wherein said generating step includes:
selectively directing drilling mud through fluid coupling means between said reaction mass and said generator housing, to provide a torque between said reaction mass and said generator housing in a desired rotational direction.

10. A torsional wave generator capable of propagating torsional waves along a drill string for the purpose of transmitting information signals, said torsional wave generator comprising:
reaction mass means rotatably coupled to the drill string; and
means effective independently of drill-string angular velocity, for producing a torque between said reaction mass means and the drill string, whereby a torsional wave is generated for propagation along the drill string;
and wherein said means for producing a torque includes
first fluid coupling means rigidly connected to the drill string and having a plurality of vanes,
second fluid coupling means rigidly connected to said reaction mass means and having a like plurality of chambers into which said vanes extend, and
valve means for selectively controlling the flow of drilling mud to produce a relative torque between said first and second fluid coupling means, said valve means being operative to direct drilling mud into said chambers to effect relative motion in a selected direction between said vanes and said chambers.

11. A torsional wave generator as set forth in claim 10, wherein said valve means includes:
three sets of mud ducts communicating, respectively, with said chambers on one side of said vanes, with said chambers on the other side of said vanes, and with the drill string below said generator;
a rotatable valve plate with a plurality of openings therein for directing mud into one of said three sets of mud ducts; and
means for operating said rotatable valve plate in accordance with information signals.

12. A torsion wave generator for connection to a rotatable drill string, for propagating torsional waves along the string, said torsional wave generator comprising:
a body, rigidly connected to the drill string, and capable of receiving and passing a flow of drilling mud supplied down the drill string;
a reaction mass rotatably connected to said body; and
torque producing means utilizing the flow of drilling mud to produce a torque between said body and said reaction mass, thereby producing a torsional wave in the drill string, regardless of the speed of rotation of the drill string;
and wherein said torque producing means includes
a plurality of chambers within said reaction mass, into which the flow of drilling mud can be directed, a plurality of vanes rigidly attached to the drill string and extending into said chambers, and means for selectively directing a flow of mud into said chambers on a selected side of said vanes, to produce a torque between said vanes and said chambers.

13. A torsional wave generator as set forth in claim 12, wherein said means for selectively directing the flow of mud includes:

a first set of ducts communicating with said chambers on one side of said vanes;

a second set of ducts communicating with said chambers on the other side of said vanes;

a third set of ducts communicating directly with the drill string and bypassing said chambers;

a mud flow control valve for directing mud flow selectively to one of said sets of ducts;

means for controlling said mud valve in accordance with information signals; and a set of ports in said chambers, communicating with the drill string and providing a path for the mud after movement of said vanes in said chambers.

14. A torsional wave generator as set forth in claim 13, wherein said mud flow control valve includes a movable plate having a plurality of openings therein and having three positions, in which said openings are positioned over said first, second and third sets of ducts, respectively; and said means for controlling said mud flow control valve includes solenoid means for moving said movable plate.

15. A torsional wave generator as set forth in claim 14, and further including:

electric power generation means driven by the flow of drilling mud, to provide power to said solenoid means.

16. A method for generating torsional acoustic waves in a drill string, for the transmission of telemetary data, said method comprising the steps of:

generating a torque between a reaction mass mounted for limited rotation about a drill string and a generator housing rigidly connected into the drill string, wherein said generating step includes selectively directing drilling mud through fluid coupling means between said reaction mass and said generator housing, to provide a torque between said reaction mass and said generator housing in a desired rotational direction;

rotating said generator housing and the drill string with respect to said reaction mass, as a result of the generated torque;

thereby propagating a torsional wave along the drill string, independently of the drill string angular velocity; and biasing said reaction mass into a neutral position with respect to said generator body, whereby said reaction mass rotates synchronously with said drill string when mud is not being directed through the fluid coupling means.

* * * * *

UNITED STATES PATENT AND TRADEMARK OFFICE
CERTIFICATE OF CORRECTION

PATENT NO. : 4,283,779
DATED : August 11, 1981
INVENTOR(S) : Arthur E. Lamel

It is certified that error appears in the above—identified patent and that said Letters Patent is hereby corrected as shown below:

Column 1, line 31, change "3,990,827" to -- 3,900,827 --;

line 31, change "Teletering" to -- Telemetering --.

Column 3, line 40, change "propogation" to -- propagation --.

Column 4, line 58, change "biassing" to -- biasing --.

Column 5, line 37, change "alone" to -- along --.

Column 9, line 6, change "dispoed" to -- disposed --;

line 58, delete "of".

Signed and Sealed this

Twenty-ninth Day of December 1981

[SEAL]

*Attest:*

*Attesting Officer*

GERALD J. MOSSINGHOFF
*Commissioner of Patents and Trademarks*